(No Model.)
T. CRANEY.
SALT GRAINER.
No. 344,632. Patented June 29, 1886.
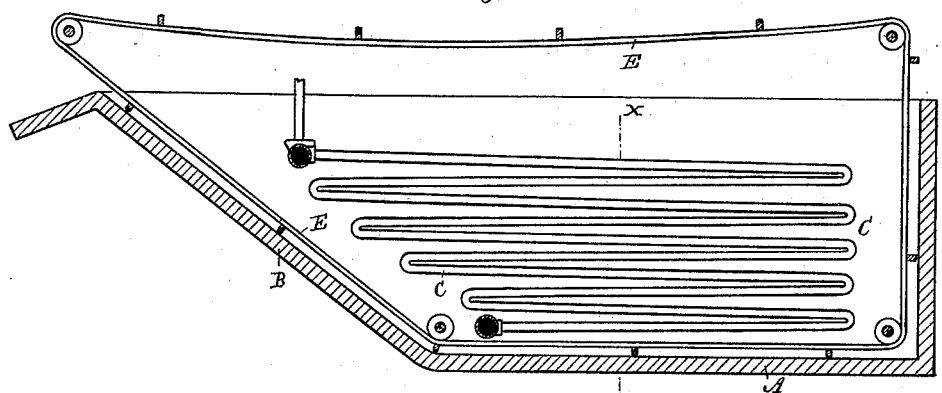
Fig. 1
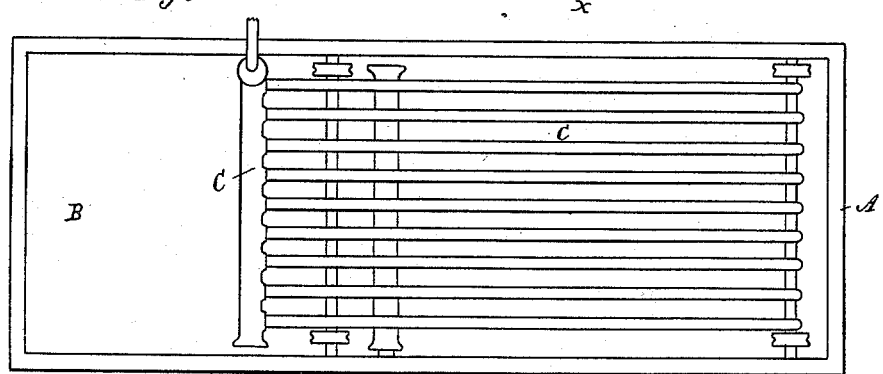
Fig. 3
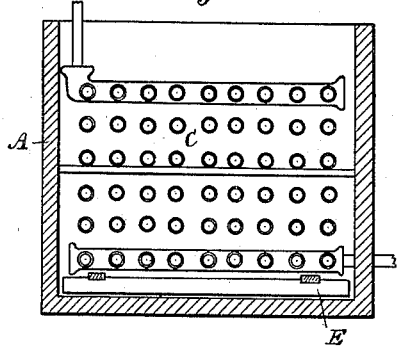
Fig. 2
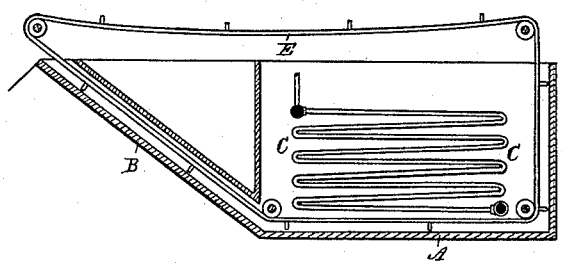
Fig. 4
Attest:
John Schuman.
Inventor:
Thomas Craney.
by his Atty
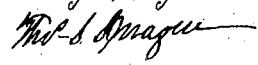
N. PETERS, Photo-Lithographer, Washington, D. C.

UNITED STATES PATENT OFFICE.

THOMAS CRANEY, OF BAY CITY, MICHIGAN.

SALT-GRAINER.

SPECIFICATION forming part of Letters Patent No. 344,632, dated June 29, 1886.

Application filed October 29, 1885. Serial No. 181,254. (No model.)

*To all whom it may concern:*

Be it known that I, THOMAS CRANEY, of Bay City, in the county of Bay and State of Michigan, have invented new and useful Improvements in Salt-Grainers; and I do hereby declare that the following is a full, clear, and exact description thereof, reference being had to the accompanying drawings, which form a part of this specification.

This invention relates to a new and useful improvement in apparatus for making salt; and the invention consists in the peculiar arrangement and construction of the devices for heating and evaporating the brine, all as more fully hereinafter described.

In the drawings which accompany this specification, Figure 1 is a vertical central longitudinal section of my improved apparatus. Fig. 2 is a cross-section thereof on line $x\,x$. Fig 3 is a plan thereof, and Fig. 4 is a diagram of a modification.

A is a salt-pan, of the kind commonly called "grainer," and is provided with the inclined end B.

C is a heating-coil, of the kind known in steam-heating as a "box-coil," suitable steam-connection being made therewith. This coil is secured within the grainer in such a manner that it is submerged in the brine with its bottom some distance above the bottom of the grainer. Its form and dimensions are such that it conforms to the shape of the grainer, with the exception of one or more of its sides, preferably the front and rear, which leave more of an open space for the free circulation of the brine.

E is a scraper or other equivalent device for collecting the salt. It travels along the bottom of the grainer and up the inclined end, so as to remove the salt and carry it out of the grainer to a place of deposit.

In practice the brine in the grainer being exposed to a much larger amount of heating-surface in proportion to the amount of brine than in the ordinary grainer with one tier of steam-pipes, a more rapid evaporation will take place, while at the same time a strong and uniform circulation takes place through the whole body of the brine, said circulation being in an upward direction in the vertical intervals between the individual coils of pipes and in a downward direction at the sides or ends, where such circulation has been provided for. The salt crystals formed by the evaporation of the brine are carried by the circulation to the bottom of the grainer, where they accumulate and are removed by the salt-collector.

To get the full advantage of my improvement I make the grainer considerably higher than the ordinary grainer in use, whereby I gain the additional advantage of having but little surface exposed to the air in proportion to a large body of brine.

By my improved apparatus the evaporating capacity of the grainer is largely increased, while the salt manufactured thereby is of very even and fine grain, owing to the uniform heating and circulation of the brine.

In Fig. 4 a modification of my apparatus is shown in diagram, in which both the box-coil and the grainer are made rectangular, and an inclined duct is provided to allow the scraper to remove the salt.

Instead of having the downward circulation of the brine provided for at the sides or ends of the coil, the latter may be constructed in sections with suitable spaces between them for a free downward circulation of the brine.

In my Patent No. 305,153, and in various other forms of grainers, the steam-heating pipes or coils are arranged horizontally near the bottom of the grainer; but such construction necessitates the use of a very shallow grainer, and even then the heating-surface is too small compared with the amount of brine to produce the best results.

I attach importance to my box-coil, whereby the evaporating capacity of the grainer is increased and the evaporation much more rapid.

What I claim as my invention is—

1. As a means for evaporating and circulating the brine in a grainer, a box-coil of corresponding shape with the grainer, and secured therein some distance above its bottom, and with suitable spaces provided for a free downward circulation of the brine, substantially as described.

2. In combination with the grainer A, the box-coil C, conforming to the shape of the grainer and secured some distance above its bottom for the free operation of a scraper, substantially as described.

THOS. CRANEY.

Witnesses:
H. S. SPRAGUE,
CHARLES J. HUNT.